(12) United States Patent
Chatterjee et al.

(10) Patent No.: US 10,229,014 B1
(45) Date of Patent: Mar. 12, 2019

(54) SYSTEMS, METHODS AND DEVICES FOR PERFORMING FAST RAID RE-SYNCHRONIZATION USING A RAID SANDWICH ARCHITECTURE

(71) Applicant: American Megatrends, Inc., Norcross, GA (US)

(72) Inventors: Paresh Chatterjee, Fremont, CA (US); Anandh Mahalingam, Bellevue, WA (US); Venugopalreddy Mallavaram, Duluth, GA (US); Sankarji Gopalakrishnan, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 162 days.

(21) Appl. No.: 15/353,790

(22) Filed: Nov. 17, 2016

Related U.S. Application Data

(60) Provisional application No. 62/257,369, filed on Nov. 19, 2015.

(51) Int. Cl.
| | | |
|---|---|---|
| *G06F 11/00* | (2006.01) | |
| *G06F 11/16* | (2006.01) | |
| *G06F 11/10* | (2006.01) | |
| *G06F 3/06* | (2006.01) | |

(52) U.S. Cl.
CPC ......... *G06F 11/1662* (2013.01); *G06F 3/064* (2013.01); *G06F 3/065* (2013.01); *G06F 3/0619* (2013.01); *G06F 3/0689* (2013.01); *G06F 11/1076* (2013.01); *G06F 2201/805* (2013.01); *G06F 2201/85* (2013.01)

(58) Field of Classification Search
CPC .... G06F 11/1662; G06F 3/0619; G06F 3/064; G06F 3/065; G06F 3/0689; G06F 11/1076
See application file for complete search history.

(56) References Cited

U.S. PATENT DOCUMENTS

| | | | | |
|---|---|---|---|---|
| 6,662,268 | B1 * | 12/2003 | McBrearty | G06F 11/2082 711/111 |
| 8,001,352 | B1 | 8/2011 | Chatterjee et al. | |
| 8,255,739 | B1 | 8/2012 | Chatterjee et al. | |
| 2005/0278476 | A1 * | 12/2005 | Teske | G06F 11/1076 711/100 |

(Continued)

*Primary Examiner* — Jason B Bryan
(74) *Attorney, Agent, or Firm* — Meunier Carlin & Curfman LLC

(57) ABSTRACT

An example computer-implemented method for restoring data consistency in a RAID array can include detecting failure of a disk of the RAID array, maintaining tracking information for write input/output ("I/O") operations that effect a data block or a parity block stored on the failed disk, re-commissioning the failed disk and re-synchronizing the RAID array using the tracking information. The tracking information can be used to restore consistency to at least one of the data stripes. For example, the RAID array can store data in one or more data stripes, where each data stripe has a plurality of data and parity blocks. Additionally, the data stripes to which consistency is restored can include a data block or a parity block that is stored on the re-commissioned disk and that is effected by the write I/O operations and stored on the re-commissioned disk.

14 Claims, 5 Drawing Sheets

(56) References Cited

U.S. PATENT DOCUMENTS

| | | | | |
|---|---|---|---|---|
| 2008/0126855 A1* | 5/2008 | Higashijima | ....... | G06F 11/0727 714/16 |
| 2014/0189424 A1* | 7/2014 | Sim | ..................... | G06F 11/1096 714/6.24 |
| 2015/0134875 A1* | 5/2015 | Veal | ...................... | G06F 3/0688 711/102 |

* cited by examiner

SYSTEMS, METHODS AND DEVICES FOR PERFORMING FAST RAID RE-SYNCHRONIZATION USING A RAID SANDWICH ARCHITECTURE

CROSS-REFERENCE TO RELATED APPLICATIONS

This application claims the benefit of U.S. Provisional Patent Application No. 62/257,369, filed on Nov. 19, 2015, entitled "SYSTEMS, METHODS AND DEVICES FOR PERFORMING FAST RAID RE-SYNCHRONIZATION USING A RAID SANDWICH ARCHITECTURE," the disclosure of which is expressly incorporated herein by reference in its entirety.

BACKGROUND

To protect against data loss, a storage system can include a redundant array of inexpensive disks ("RAID"). The RAID level used for a RAID array depends on a number of factors including redundancy level, performance and reliability of the desired array. Standard RAID levels include RAID 1, RAID 4, RAID 5, RAID 6, etc. For example, in a RAID 5 array, data is striped across the plurality of disks in the RAID array. Additionally, the parity chunks in a RAID 5 array are distributed or staggered across the plurality of disks. In the event of disk failure, the chunk contained on the failed disk can be computed based on the chunks contained on the remaining (or neighboring, peer, etc.) disks of the RAID array.

In some cases, a RAID layer controlling the RAID array can be configured to fail a disk of the RAID array. For example, the RAID layer can remove a disk from operation in response to detecting a disk error. A RAID array operating with a failed disk is operating in a degraded mode. After analyzing the failed disk and, if necessary, repairing the disk error, the failed disk can be re-commissioned into the RAID array. In other words, the failed disk can be returned to operation. It should be understood that write input/output ("I/O") operations can be received and executed while the RAID array is in the degraded mode. Therefore, when the failed disk is re-commissioned, the RAID array should be re-synchronized by restoring consistency to the data stripes of the RAID array. In related art, the entire failed disk is re-built in order to restore consistency to the RAID array. It should be understood that this process is both time-consuming and places increased load on the storage system.

SUMMARY

An example computer-implemented method for restoring data consistency in a RAID array can include detecting failure of a disk of the RAID array, maintaining tracking information for write I/O operations that effect a data block or a parity block stored on the failed disk, re-commissioning the failed disk and re-synchronizing the RAID array using the tracking information. The tracking information can be used to restore consistency to at least one of the data stripes. For example, the RAID array can store data in one or more data stripes, where each data stripe has a plurality of data and parity blocks. Additionally, the data stripes to which consistency is restored can include a data or parity block that is stored on the re-commissioned disk and that is effected by the write I/O operations.

Additionally, the RAID array is optionally re-synchronized by restoring consistency only to data stripes that include a data or parity block that is stored on the re-commissioned disk and that is effected by the write I/O operations.

Optionally, re-commissioning the failed disk includes restoring the failed disk to operation and causing a RAID layer controlling the RAID array to view the re-commissioned disk as being synchronized with the RAID array. In other words, when the failed disk is restored, the RAID layer does not begin to entirely re-build the failed disk. Instead, the RAID layer views the re-commissioned disk as synchronized, and the data stripes of the RAID array are selectively returned to consistency. For example, consistency can be restored only to data stripes that include a data or parity block that is stored on the re-commissioned disk and that is effected by the write I/O operations. The remaining data stripes (e.g., data stripes that include data and/or parity blocks not effected by write I/O operations subsequent to the disk failure) do not need to be restored to consistency because these stripes remain consistent.

Alternatively or additionally, the computer-implemented method can include reading one or more blocks from the re-commissioned disk, where each of the read blocks is a data block or a parity block stored on the re-commissioned disk and effected by the write I/O operations, and receiving a read error in response to reading each of the read blocks. Optionally, re-synchronizing the RAID array using the tracking information in order to restore consistency to at least one of the data stripes includes causing the RAID layer to compute each of the read blocks using RAID logic.

Optionally, if the read block is a data block, the computer-implemented method can include causing the RAID layer to compute the read block using the RAID logic by reading one or more data blocks of a data stripe including the read block, reading one or more parity blocks of the data stripe including the read block, computing a new parity block based on the one or more data blocks, the one or more parity blocks and the read block and writing the new parity block and the read block to the RAID array. The one or more data blocks and the one or more parity blocks can be stored on peer disks of the RAID array (e.g., disks neighboring the failed/re-commissioned disk). In addition, the read block can optionally include data corresponding to a write I/O operation.

Alternatively or additionally, if the read block is a parity block, the computer-implemented method can include causing the RAID layer to compute the read block using the RAID logic by causing the RAID layer to re-write at least one data block of a data stripe including the read block. The at least one data block can be stored on a peer disk of the RAID array (e.g., a disk neighboring the failed/re-commissioned disk). For example, the computer-implemented method can further include reading one or more data blocks of the data stripe including the read block, computing a new parity block based on the one or more data blocks of the data stripe including the read block and writing the new parity block and the at least one data block to the RAID array.

Optionally, the computer-implemented method can further include analyzing the failed disk to find disk errors and repairing the disk errors. The disk errors can be repaired prior to re-commissioning the failed disk.

It should be understood that the above-described subject matter may also be implemented as a computer-controlled apparatus, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 4A is a block diagram illustrating an example four disk array configured according to RAID level 5. FIG. 4B is a block diagram illustrating a four disk array operating in a degraded mode after the failure of a disk. FIG. 4C is a block diagram illustrating a four disk array operating in a degraded mode after the failure of the disk. FIG. 4D is a block diagram illustrating a four disk array after the failed disk has been re-commissioned.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. While implementations will be described for performing fast RAID resynchronization, it will become evident to those skilled in the art that the implementations are not limited thereto, but can also be applied in other applications such as rebuilding new mass storage device drives, for example.

Figure 1:
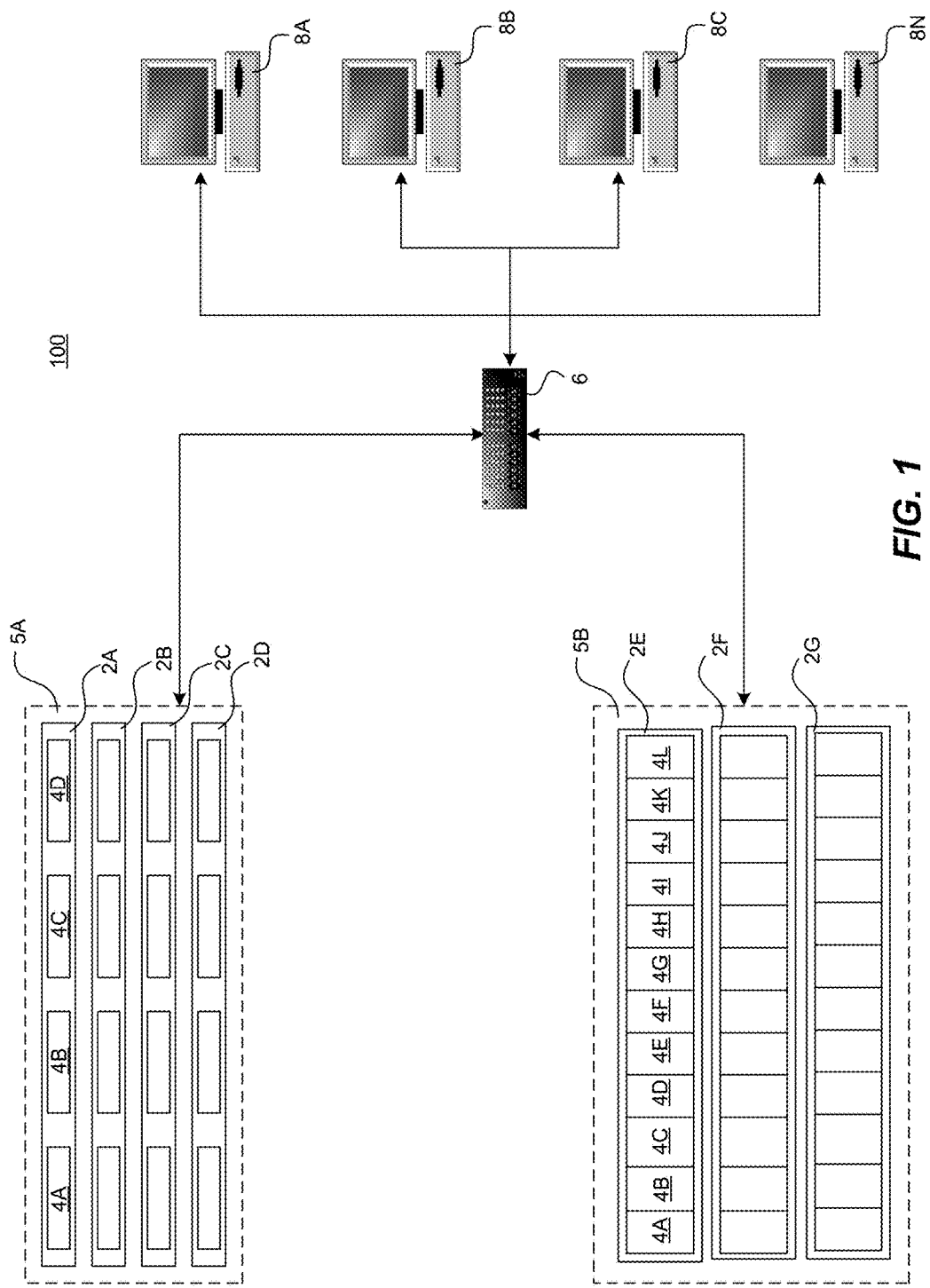
FIG. 1 is a computer architecture and network diagram showing aspects of a computer network and a storage server computer that provides an operating environment for embodiments of the disclosure presented herein.
Figure 2:
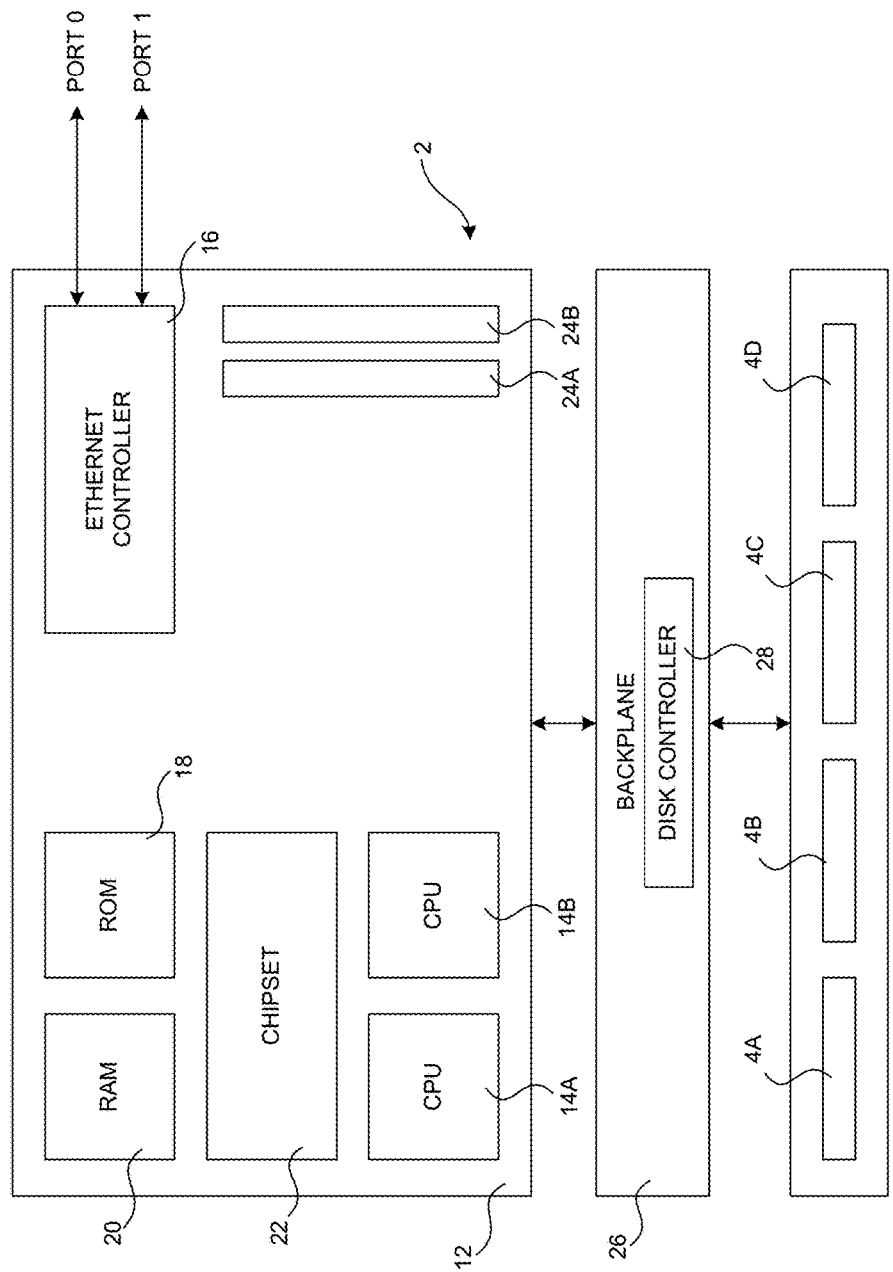
FIG. 2 is a computer architecture diagram illustrating aspects of the hardware of an illustrative storage server computer described herein.
Figure 3:
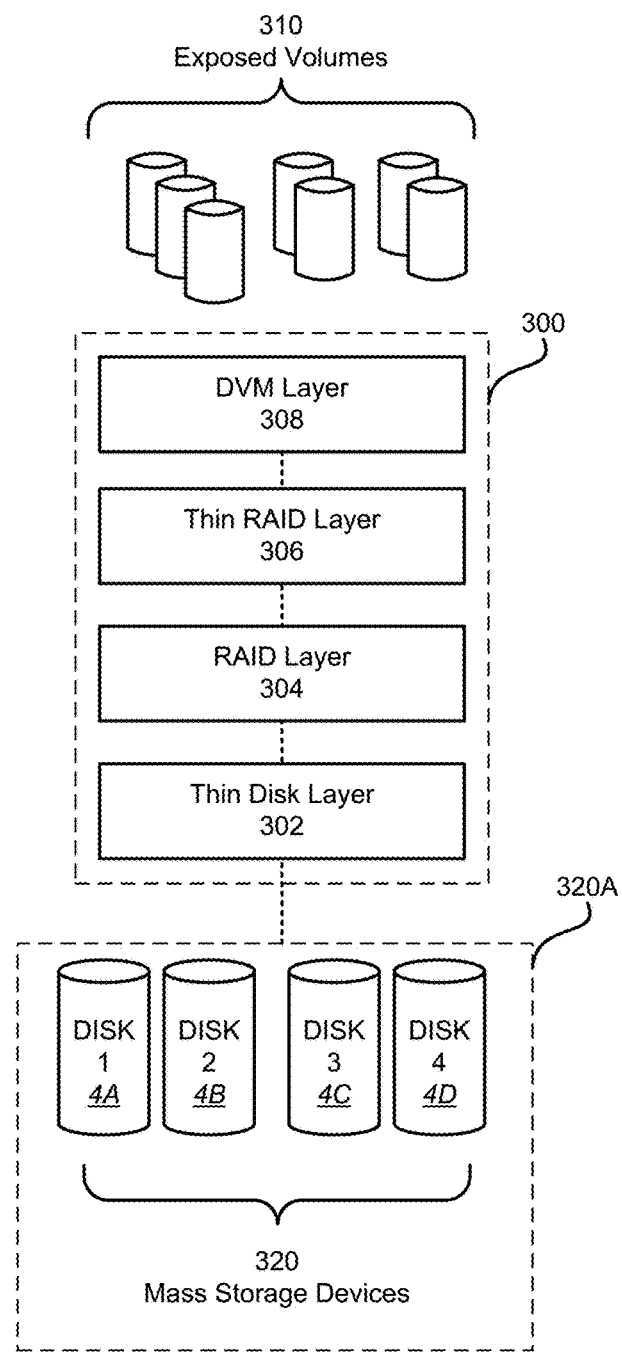
FIG. 3 is a software architecture diagram illustrating various aspects of a storage stack utilized by a storage server computer described herein.

FIGS. 1-3 and the following discussion are intended to provide a brief, general description of a suitable computing environment in which the embodiments described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices. While the implementations presented herein will be described in the general context of program modules that execute in conjunction with an operating system on a computer system, those skilled in the art will recognize that they may also be implemented in combination with other program modules.

Turning now to FIG. 1, details will be provided regarding an illustrative operating environment for the implementations presented herein, as well as aspects of software components that provide the functionality described herein for performing efficient patrol read operations in a storage system. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes hard disk drives 4A-4L. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

Data may be striped across the nodes of each storage cluster. For instance, the cluster 5A may stripe data across the storage nodes 2A, 2B, 2C and 2D. The cluster 5B may similarly stripe data across the storage nodes 2E, 2F and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network (LAN) as the clusters 5A-5B or may be connected to the clusters 5A-5B via a distributed wide area network, such as the Internet. An appropriate protocol, such as the Internet Small Computer Systems Interface ("iSCSI") or Fiber Channel protocol may be utilized to enable the initiators 8A-8N to communicate with and utilize the various functions of the storage clusters 5A-5B over a wide area network such as the Internet. An appropriate protocol, such as iSCSI, Fiber Channel, or Serial Attached SCSI ("SAS"), is also used to enable the members of the storage cluster to communicate with each other. These two protocols need not be similar.

Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Referring now to FIG. 2, an illustrative computer hardware architecture for practicing various embodiments will now be described. In particular, FIG. 2 shows an illustrative computer architecture and implementation for each storage node 2. In particular, each storage server computer 2 includes a baseboard 12, or "motherboard," which is a printed circuit board to which a multitude of components or devices may be connected by way of a system bus or other electrical communication path. In one illustrative embodiment, these components include, without limitation, one or more central processing units ("CPUs") 14A-14B, a network adapter, such as the Ethernet controller 16, a system memory, including a Read Only Memory 18 ("ROM") and a Random Access Memory 20 ("RAM"), and other hardware for performing input and output, such as a video display adapter or a universal serial bus port ("USB"), not all of which are illustrated in FIG. 2.

The motherboard 12 may also utilize a system board chipset 22 implementing one or more of the devices described herein. One or more hardware slots 24A-24B may also be provided for expandability, including the addition of a hardware RAID controller to the storage server computer 2. It should also be appreciate that, although not illustrated in FIG. 2, a RAID controller may also be embedded on the motherboard 12 or implemented in software by the storage server computer 2. It is also contemplated that the storage server computer 2 may include other components that are not explicitly shown in FIG. 2 or may include fewer components than illustrated in FIG. 2.

As described briefly above, the motherboard 12 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 20 and a ROM 18. The ROM 18 may store a basic input/output system ("BIOS") or Extensible Firmware Interface ("EFI") compatible firmware that includes program code containing the basic routines that help to transfer information between elements within the storage server computer 2. As also described briefly above, the Ethernet controller 16 may be capable of connecting the local storage server computer 2 to the initiators 8A-8N via a network. Connections which may be made by the network adapter may include LAN or WAN connections. LAN and WAN networking environments are commonplace in offices, enterprise-wide computer networks, intranets, and the Internet. The CPUs 14A-14B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 12 is connected via a backplane 26 and disk controller 28 to one or more mass storage devices. The mass storage devices may comprise hard disk drives 4A-4D or other types of high capacity high speed storage. The disk controller 28 may interface with the hard disk drives 4A-4D through a serial advanced technology attachment ("SATA") interface, a small computer system interface ("SCSI"), a fiber channel ("FC") interface, a SAS interface, or other standard interface for physically connecting and transferring data between computers and physical storage devices. The mass storage devices may store an operating system suitable for controlling the operation of the storage server computer 2, such as the LINUX operating system. The mass storage devices may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Referring now to FIG. 3, an example computer software architecture for practicing the various embodiments presented herein will now be described. The computer software architecture can be implemented in a storage node 2 shown in FIGS. 1 and 2, for example. In particular, FIG. 3 illustrates a storage stack 300 used in the embodiments described herein. The storage stack 300 can include a thin disk layer 302, a RAID layer 304, a thin RAID layer 306 and a distributed volume management ("DVM") layer 308. At the top of the storage stack 300, storage volumes 310 are exposed, for example, to the initiators 8A-8N shown in FIG. 1. At the bottom of the storage stack 300 are the mass storage devices 320, such as the disks 4A-4D, that are used to store the data. As discussed above, the mass storage devices are connected to a disk controller such as the disk controller 28 shown in FIG. 2. The disk controller interfaces with the mass storage devices using any standard interface such as SATA, SCSI, FC, SAS interface, etc. for physically connecting and transferring data between computers and the mass storage devices.

The mass storage devices 320 can be organized into a RAID array 320A. The RAID level used for the RAID array 320A can depend on a number of factors, such as the redundancy level, performance requirements and reliability of the desired array. For example, the mass storage devices 320 can be organized into a RAID 5 array, e.g., block-level striping across the RAID array 320A with parity data distributed across all members of the RAID array 320A. It will be appreciated, however, that the embodiments described herein may be used with storage nodes 2 connected to a RAID array 320A organized with other standard RAID levels where redundant information is included in the storage of the array, including RAID 1, RAID 4 and RAID 6, as well as hybrid levels such as RAID 50 or RAID 60.

The RAID array 320A is accessed through the RAID layer 304. The RAID layer 304 abstracts the organization of the RAID array 320A and presents a logical block-level interface to higher layers (e.g., the DVM layer 308) in the storage stack 300. The RAID layer 304 can be implemented on the storage node 2 in software, hardware, or a combination thereof. For example, the RAID layer 304 can be provided by the MD kernel extension provided by the LINUX operating system. Alternatively or additionally, the RAID layer 304 can be provided by a STORTRENDS® storage solution from AMERICAN MEGATRENDS, INC. of NORCROSS, GEORGIA, installed in the storage node 2. Additionally, the RAID layer 304 can optionally be implemented by software and/or hardware components from a variety of vendors beyond those described herein.

The DVM layer 308 uses the block-level interface provided by the RAID layer 304 to manage the available storage capacity of the RAID array 320A and service I/O operations initiated by the initiators 8A-8N. The DVM layer 308 can implement a variety of storage management functions, such as volume virtualization, thin provisioning, snapshots, locking, data replication, etc. The DVM layer 308 can be implemented on the storage node 2 in software, hardware or a combination thereof. Volume virtualization provides the facility to create and manage multiple, logical volumes on the RAID array 320A, as well as expand a logical volume across multiple storage nodes within a storage cluster. Thin provisioning provides for the allocation of physical capacity of the RAID array 320A to logical volumes on an as-needed basis. For example, the available physical storage capacity of the RAID array 320A can be divided into a number of unique, equally-sized areas referred to as territories. Optionally, the size of a territory can be one terabyte (TB), a reduced size of 8 megabytes (MB) or any other territory size. Alternatively or additionally, the available physical storage capacity of the RAID array 320A can optionally be further subdivided into units referred to herein as provisions. The provisions can be unique, equally sized areas of the available physical capacity. For example, provisions may be 1 MB in size, a reduced size of 512 kilobytes (KB) or any other provision size. Optionally, a provision can be further subdivided into chunks. For example, the chunk size can be selected as 64 KB, a reduced size of 8 KB or any other chunk size. Snapshots provide functionality for creating and utilizing point-in-time snapshots of the contents of logical storage volumes. The locking functionality allows for synchronizing I/O operations within the storage node 2 or across nodes within the storage cluster. Data replication provides functionality for replication of data within the storage node 2 or across nodes within the storage cluster 2.

The thin disk layer 302 can intercept I/O operations sent between the mass storage devices 320 and the RAID layer 304. Additionally, the thin RAID layer 306 can intercept I/O operations sent between the higher layers (e.g., the operating system and/or applications layers, which are not shown in FIG. 3) and the RAID layer 304. The combination of the thin disk layer 302 and the thin RAID layer 306 is also referred to herein as "RAID sandwich architecture." The RAID sandwich architecture can be implemented on the storage node 2 in software, hardware, or a combination thereof. For example, the RAID sandwich architecture can optionally be provided by the MD kernel extension provided by the LINUX operating system. Additionally, the RAID sandwich architecture can optionally be implemented by software and/or hardware components from a variety of vendors beyond those described herein.

Figure 4A:
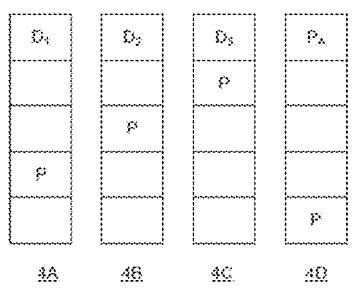
FIGS. 4A-4D are block diagrams illustrating various operational states of a RAID array as described herein.

As discussed above, the RAID layer 304 abstracts the organization of the RAID array 320A and presents a logical block-level interface to higher layers in the storage stack 300. For example, the RAID layer 304 can implement RAID level 5, where data is striped across the plurality of disks (e.g., disks 4A-4D) in the RAID array 320A. In a four disk array, a RAID stripe includes data block $D_1$ stored on disk 1 (e.g., "4A"), data block $D_2$ stored on disk 2 (e.g., "4B"), data block $D_3$ stored on disk 3 (e.g., "4C") and parity block $P_A$ stored on disk 4 (e.g., "4D"), for example. The parity block $P_A$ can be computed using XOR logic of data block $D_1$, data block $D_2$ and data block $D_3$ (e.g., $P_A=D_1 \oplus D_2 \oplus D_3$). Additionally, the parity blocks in a RAID 5 array are distributed or staggered across the plurality of disks. FIG. 4A is a block diagram illustrating an example four disk array configured according to RAID level 5. Although the example implementations discussed below use RAID level 5, it should be understood that the systems, methods and devices provided herein can be implemented with other RAID levels, such as RAID level 6, where data is striped across the plurality of disks in the RAID array 320A and includes two parity block (e.g., a parity block computed using XOR logic and a parity block computed using checksum logic).

Figure 4B:
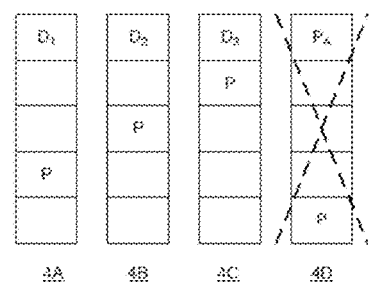

When the RAID array 320A is configured in RAID level 5, the RAID layer 304 can compute a missing data block of a data stripe (e.g., a block stored on the failed mass storage device) based on the blocks of the data stripe stored on the remaining or neighboring mass storage devices using the RAID logic. For example, if disk 4 fails, parity block $P_A$ can be computed based on data block $D_1$ stored on disk 1, data block $D_2$ stored on disk 2 and data block $D_3$ stored on disk 3. FIG. 4B is a block diagram illustrating a four disk array operating in a degraded mode after the failure of disk 4. Additionally, the RAID layer 304 can be configured to detect failure of, or a problem with, the mass storage devices 320 in the RAID array 320A. In response to detecting failure of one of the mass storage devices 320, the RAID layer 304 can be configured to fail the mass storage device. In other words, the RAID layer 304 can remove the failed mass storage device from operation. The RAID array 320A operates in a degraded mode following failure of one of the mass storage devices 320.

Figure 4C:
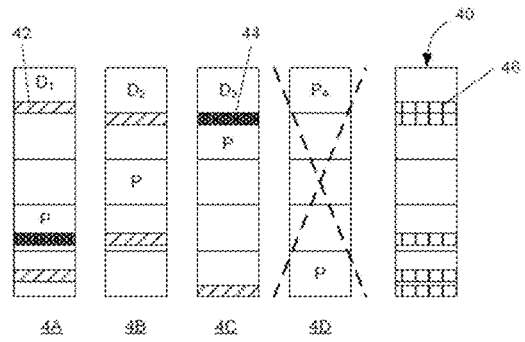

The RAID sandwich architecture (e.g., the thin disk layer 302 and the thin RAID layer 306) can maintain tracking information for write input/output ("I/O") operations that effect data stored on the failed mass storage device. It should be understood that the data stored on the failed mass storage device can include a portion of, or an entire, data block or parity block. Similar to FIG. 4B, FIG. 4C is a block diagram illustrating a four disk array operating in a degraded mode after the failure of disk 4. Additionally, FIG. 4C shows the tracking information for write I/O operations that effect data stored on the failed disk. The tracking information can optionally be a tracking map structure 40. The tracking map structure 40 can optionally maintain information regarding write I/O operations that effect data stored on the failed mass storage device. For example, the tracking map structure 40 can maintain addresses (or locations) of portions of the failed mass storage device effected by write I/O operations. These portions can include portions of data blocks of the failed mass storage device to which write I/O operations are addressed and/or portions of parity blocks of the failed mass storage device that change as a result of write I/O operations addressed to the other mass storage devices in the RAID array 320A. Alternatively or additionally, the tracking map structure 40 can maintain data corresponding to write I/O operations. In FIG. 4C, new writes 42 are shown by diagonal hashing, parity changes 44 are shown by cross hatching and tracking information corresponding to write I/O operations that effect the failed disk 46 are shown by vertical hatching.

Alternatively or additionally, the failed disk (e.g., disk 4) can optionally be analyzed. Self-monitoring analysis and reporting technology ("SMART") can optionally be used to identify instances where the RAID layer 304 improperly failed a mass storage device of the RAID array 320A. For example, SMART provides information regarding the reliability of hard disk drives (e.g., mass storage devices 320) and can be used to predict failure. By using SMART, a mass storage device that is prematurely failed by the RAID layer 304 can be identified. The prematurely failed mass storage device can then be re-commissioned into the RAID array 320A. Additionally, SMART can optionally be used to find and/or fix mass storage device errors. For example, SMART provides information concerning hard disk drive errors. Additionally, hard drive self-tests can be performed to identify issues/problems with a failed mass storage device. A short self-test can identify issues by testing the electrical and mechanical performance of the failed mass storage device. Additionally, a long self-test can identify issues by performing a sector-by-sector scan of the failed mass storage device. After finding and fixing mass storage device errors, the failed mass storage device can then be re-commissioned into the RAID array 320A. SMART is known in the art and is therefore not discussed in further detail below. Alternatively, it should be understood that this disclosure contemplates using any known technology for analyzing, finding and/or repairing mass storage devices.

After analyzing, finding and/or fixing mass storage device errors, the failed mass storage device can be re-commissioned into the RAID array 320A. Upon re-commissioning the failed mass storage device, the RAID array 320A can be re-synchronized. As discussed above, data stored on the re-commissioned mass storage device can be computed using data stored on the remaining or neighboring mass storage devices of the RAID array 320A, for example, using appropriate RAID logic. In related art, upon re-commissioning, a mass storage device can be re-built by restoring consistency to a RAID array. For example, consistency can be restored to all data stripes of the RAID array using the appropriate RAID logic. In contrast, according to implementations discussed herein, the RAID array 320A can be re-synchronized using tracking information (e.g., tracking information maintained in the tracking map structure 40). The tracking information can be maintained for write I/O operations that effect a data block or a parity block stored on the failed mass storage device.

The tracking information can be used to restore consistency to data stripes that include a data or parity block that is stored on the re-commissioned mass storage device and is effected by the write I/O operations. Optionally, the RAID array 320A can be re-synchronized by restoring consistency only to data stripes that include a data or parity block that is stored on the re-commissioned mass storage device and is effected by the write I/O operations. Alternatively or additionally, re-commissioning the failed mass storage device can optionally include restoring the failed mass storage device to operation and causing the RAID layer 304 controlling the RAID array 320A to view the re-commissioned mass storage device as being synchronized. In other words, when the failed mass storage device is restored, the RAID layer 304 does not begin to re-build the entire mass storage device. Instead, the RAID layer 304 views the re-commissioned disk as synchronized, and consistency can be restored to the data stripes of the RAID array 320A in a controlled manner. For example, consistency can be restored only to data stripes that include a data or parity block that is stored on the re-commissioned mass storage device and is effected by the write I/O operations. The remaining data stripes (e.g., data stripes including data and/or parity blocks stored on the re-commissioned drive but not effected by write I/O operations subsequent to the mass storage device failure) do not need to be restored to consistency because these stripes remain consistent.

Figure 4D:
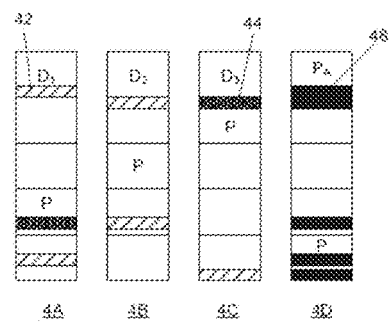

As discussed above, the tracking information can be used to restore consistency to data stripes that include a data or parity block that is stored on the re-commissioned mass storage device and is effected by the write I/O operations. For example, the thin RAID layer 306 can be configured to read data tracks (e.g., portions of the re-commissioned mass storage device) having bad data such as, for example, the data tracks effected by write I/O operations subsequent to mass storage device failure. FIG. 4D is a block diagram illustrating a four disk array after the failed disk has been re-commissioned. In FIG. 4D, the data tracks having bad data 48 are shaded. Additionally, the data tracks having bad data 48 shown in FIG. 4D correspond to the tracking information for write I/O operations that effect the failed disk 46 shown in FIG. 4C. The thin RAID layer 306 can use the tracking information to read data tracks of the re-commissioned mass storage device having bad data 48, for example. Additionally, the thin disk layer 302 can be configured to return read errors in response to reading data tracks of the re-commissioned hard disk drive having bad data 48. Thereafter, the RAID layer 304 can be used to restore consistency to the data stripes that include a data or parity block that is stored on the re-commissioned mass storage device and is effected by the write I/O operations. It should be understood that the RAID layer 304 can restore consistency to the data stripes using RAID logic.

Example operations for re-synchronizing the data stripes that include a data or parity block that is effected by write I/O operations (e.g., the data tracks having bad data 48 shown in FIG. 4D) are discussed below. As discussed above, the thin RAID layer 306 uses the tracking information to read the data tracks having bad data 48. The thin disk layer 302 returns read errors in response to reading the data tracks having bad data 48. Thereafter, the RAID layer 304 restores consistency to the data stripes that include the data tracks having bad data 48. For example, if a data track having bad data 48 is a parity block stored on the re-commissioned mass storage device (e.g., disk 4D), the parity fix-logic includes re-writing a data block stored on a neighboring or peer mass storage device (e.g., any one of disks 4A-4C) with the same data. Re-writing the data block stored on the neighboring or peer mass storage device causes the thin RAID layer 306 to read the parity block, and in response, the thin disk layer 302 returns a read error. In response to the read error, the RAID layer 304 reads all of the neighboring or peer mass storage devices and computes the new parity block based on the data read from the neighboring or peer mass storage devices (e.g., $P_{NEW}=D_{PEER1} \oplus D_{PEER2} \ldots \oplus D_{PEERN}$). The RAID layer 304 then writes the data block to the neighboring or peer mass storage device and the new parity block to the re-commissioned mass storage device. Additionally, if a data track having bad data 48 is a data block stored on the re-commissioned mass storage device (e.g., disk 4D), the data fix-logic includes reading the data block stored on the re-commissioned mass storage device. For example, the thin RAID layer 306 reads the data block stored on the re-commissioned mass storage device, and in response, the thin disk layer 302 returns a read error. In response to the read error, the RAID layer 304 reads all of the neighboring or peer mass storage devices (including the data and parity blocks). Then, the RAID layer 304 computes the new parity block based on the data read from the neighboring or peer mass storage devices and the new write data (e.g., $P_{NEW}=D_{PEER1} \oplus D_{PEER2} \ldots \oplus D_{PEERN} \oplus P_{OLD} \oplus W_{NEW}$). As discussed above, data corresponding to write I/O operations (e.g., $W_{NEW}$) can optionally be maintained as part of the tracking information. The RAID layer 304 then writes the data block to the re-commissioned mass storage device and the new parity block to the neighboring or peer mass storage device that stores the parity block.

Figure 5:
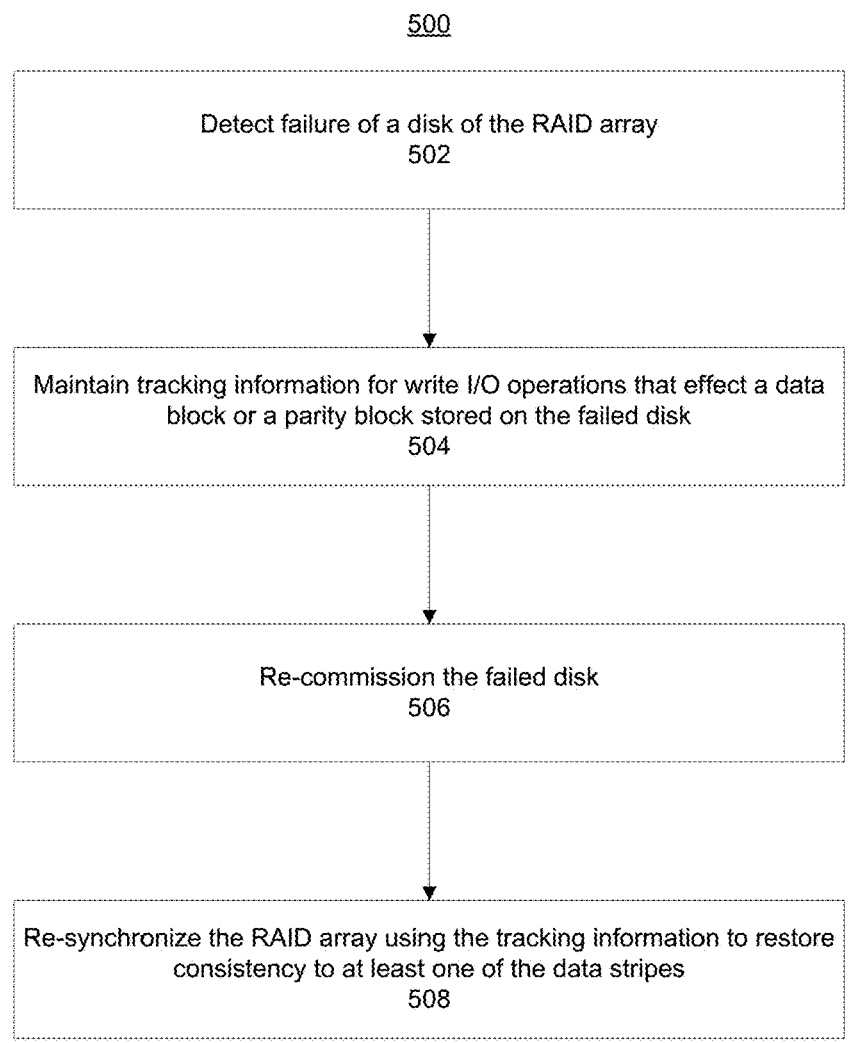
FIG. 5 is a flow diagram illustrating example operations for fast re-synchronization of a RAID array as described herein.

Referring now to FIG. 5, a flow diagram illustrating example operations 500 for fast re-synchronization of a RAID array is shown. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

At 502, failure of a hard disk drive of the RAID array can be detected. Hard disk drive failure can be detected according to any of the implementations discussed herein. Following failure of the hard disk drive, at 504, tracking information for write I/O operations that effect a data block or a parity block stored on the failed hard disk drive is maintained. For example, the tracking information can optionally be maintained in a tracking map structure such as the tracking map structure 40 shown in FIG. 4C. At 506, the failed hard disk drive can be re-commissioned into the RAID array. Optionally, prior to re-commissioning, the failed hard disk drive can be analyzed and disk errors can be found and/or fixed as discussed above. At 508, the RAID array can be re-synchronized. The tracking information can be used to restore consistency to at least one of the data stripes including a data or parity block that is stored on the re-commissioned disk and that is effected by the write I/O operations. For example, a RAID sandwich architecture such as the thin disk layer 302 and the thin RAID layer 306 discussed above can be configured to read data tracks of the re-commissioned hard disk drive having bad data (e.g., data effected by write I/O operations) and return read errors in response to reading the data tracks having bad data. A RAID layer such as the RAID layer 304 discussed above, for example, can then be used to restore consistency to the data stripes including a data or parity block that is stored on the re-commissioned disk and that is effected by the write I/O operations using RAID logic.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for restoring data consistency in a RAID array, comprising:

detecting failure of a disk of the RAID array, wherein the RAID array stores data in one or more data stripes, each data stripe comprising a plurality of data and parity blocks;

maintaining tracking information for write input/output ("I/O") operations that effect a data block or a parity block stored on the failed disk;

re-commissioning the failed disk, wherein re-commissioning the failed disk further comprises restoring the failed disk to operation and causing a RAID layer controlling the RAID array to view the re-commissioned failed disk as being synchronized with the RAID array;

reading one or more blocks front the re-commissioned failed disk, wherein each of the read blocks is a data block or a parity block effected by the write I/O operations;

receiving a read error in response to reading each of the read blocks; and re-synchronizing the RAID array using the tracking information in order to restore consistency to at least one of the data stripes, wherein the at least one of the data stripes comprises at least one of a data block and a parity block effected by the write I/O operations, and wherein re-synchronizing the RAID array using the tracking information in order to restore consistency to at least one of the data stripes further comprises causing the RAID layer to compute each of the read blocks using RAID logic.

2. The computer-implemented method of claim 1, wherein the RAID array is re-synchronized by restoring consistency only to the one or more data stripes comprising at least one of a data block and a parity block effected by the write I/O operations.

3. The computer-implemented method of claim 1, wherein if the read block is a data block, causing the RAID layer to compute the read block using the RAID logic further comprises:

reading one or more data blocks of a data stripe comprising the read block;

reading one or more parity blocks of the data stripe comprising the read block;

computing a new parity block based on the one or more data blocks, the one or more parity blocks and the read block; and writing the new parity block and the read block to the RAID array, wherein the one or more data blocks and the one or more parity blocks of the data stripe comprising the read block are stored on peer disks of the RAID array.

4. The computer-implemented method of claim 3, wherein the read block comprises data corresponding to a write I/O operation.

5. The computer-implemented method of claim 1, wherein if the read block is a parity block, causing the RAID layer to compute the read block using the RAID logic further comprises causing the RAID layer to re-write at least one data block of a data stripe comprising the read block, wherein the at least one data block of the data stripe comprising the read block is stored on a peer disk of the RAID array.

6. The computer-implemented method of claim 5, wherein causing the RAID layer to re-write at least one data block of a data stripe comprising the read block further comprises:

reading one or more data blocks of the data stripe comprising the read block;

computing a new parity block based on the one or more data blocks of the data stripe comprising the read block; and writing the new parity block and the at least one data block to the RAID array.

7. The computer-implemented method of claim 1, further comprising:

analyzing the failed disk to find one or more disk errors; and repairing the one or more disk errors, wherein the one or more disk errors are repaired prior to re-commissioning the failed disk.

8. A non-transitory computer-readable recording medium having computer-executable instructions stored thereon for restoring data consistency in a RAID array that, when executed by a storage server computer, cause the storage server computer to:

detect failure of a disk of the RAID array, wherein the RAID array stores data in one or more data stripes, each data stripe comprising a plurality of data and parity blocks;

maintain tracking information for write input/output ("I/O") operations that effect a data block or a parity block stored on the failed disk;

re-commission the failed disk, wherein re-commissioning the tailed disk further comprises restoring the failed disk to operatic and causing a RAID layer controlling the RAID array to view hue re-commissioned failed disk as being synchronized with the RAID array;

read one or more blocks from the re-commissioned failed desk, wherein each of the read blocks is a data block or a panty block effected by the write I/O operations;

receive a read error in response to reading each of the read blocks; and re-synchronize the RAID array using the tracking information in order to restore consistency to at least one of the data stripes, wherein the at least one of the data stripes comprises at least one of a data block and a parity block effected by the write I/O operations, and wherein re-synchronizing the RAID array using the tracking information in order to restore consistency to at least one of the data stripe further comprises causing the RAID layer to compute each of the read blocks using RAID logic.

9. The non-transitory computer-readable recording medium of claim 8, wherein if the read block is a data block, causing the RAID layer to compute the read block using the RAID logic further comprises:

reading one or more data blocks of a data stripe comprising the read block;

reading one or more parity blocks of the data stripe comprising the read block;

computing a new parity block based on the one or more data blocks, the one or more parity blocks and the read block; and writing the new parity block and the read block to the RAID array, wherein the one or more data blocks and the one or more parity blocks of the data stripe comprising the read block are stored on peer disks of the RAID array.

10. The no-transitory computer-readable recording medium of claim 8, wherein if the read block is a parity block, causing the RAID layer to compute the read block using the RAID logic further comprises causing the RAID layer to re-write at least one data block of a data stripe comprising the read block, wherein the at least one data block of the data stripe comprising the read block is stored on a peer disk of the RAID array.

11. The non-transitory computer-readable recording medium of claim 10, wherein causing the RAID layer to re-write at least one data block of a data stripe comprising the read block further comprises:
   reading one or more data blocks of the data stripe comprising the read block;
   computing a new parity block based on the one or more data blocks of the data stripe comprising the read block; and
   writing the new parity block and the at least one data block to the RAID array.

12. The non-transitory computer-readable recording medium of claim 8, having further computer-executable instructions stored thereon that, when executed by the storage server computer, cause the storage server computer to:
   analyze the failed disk to find one or more disk errors; and
   repair the one or more disk errors, wherein the one more disk errors are repaired prior to re-commissioning the failed disk.

13. A storage server computer for restoring data consistency in a RAID array, comprising:
   a processing unit; and
   a memory operably coupled to the processing unit, the memory having computer-executable instructions stored thereon that, when executed by the processing unit, cause the storage server computer to:
      detect failure of a disk of the RAID array, wherein the RAID array stores data in one or more data stripes, each data stripe comprising a plurality of data and parity blocks;
      maintain tracking information for write input/output ("I/O") operations that effect a data block or a parity block stored on the failed disk;
      re-commission the failed disk, wherein re-commissioning the failed disk further comprises restoring the failed disk to operation and causing a RAID layer controlling the RAID array to view the re-commissioned failed disk as being synchronized with the RAID array,
      read one or more block from the re-commissioned tailed disk, wherein each of the read blocks is a data block or a parity block effected by the write I/O operations;
      receive read error ins response to reading each of the read blocks; and
      re-synchronize the RAID array using the tracking information in order to restore consistency to at least one of the data stripes, wherein the at least one of the data stripes comprises at least one of a data block and a parity block effected by the write I/O operations, and wherein re-synchronizing the RAID array using the tracking information in order to restore consistency to at least one of the data stripes further comprises causing the RAID layer to compute each of the read blocks using RAID logic.

14. The storage server computer of claim 13, wherein if the read block is a data block, causing the RAID layer to compute the read block using the RAID logic further comprises:
   reading one or more data blocks of a data stripe comprising the read block;
   reading one or more parity blocks of the data stripe comprising the read block;
   computing a new parity block based on the one or more data blocks, the one or more parity blocks and the read block; and
   writing the new parity block and the read block to the RAID array, and wherein if the read block is a parity block, causing the RAID layer to compute the read block using the RAID logic further comprises:
   reading the one or more data blocks of the data stripe comprising the read block;
   computing a new parity block based on the one or more data blocks of the data stripe comprising the read block, and
   writing the new parity block and at least one data block to the RAID array, wherein the one or more data blocks and the one or more parity blocks of the data stripe comprising the read block are stored on peer disks of the RAID array.

* * * * *